(12) United States Patent
Clark

(10) Patent No.: US 6,511,731 B2
(45) Date of Patent: Jan. 28, 2003

(54) OPTICAL DISK LABEL AND METHOD

(75) Inventor: Richard Lee Clark, Burlington, NC (US)

(73) Assignee: Concept Design Electronics and Manufacturing, Inc., Burlington, NC (US)

(*) Notice: Subject to any disclaimer, the term of this patent is extended or adjusted under 35 U.S.C. 154(b) by 24 days.

(21) Appl. No.: 09/789,113

(22) Filed: Feb. 20, 2001

(65) Prior Publication Data

US 2002/0114921 A1 Aug. 22, 2002

(51) Int. Cl.[7] .................................................. G11B 3/70
(52) U.S. Cl. ..................... 428/136; 156/250; 156/257; 283/81; 40/340; 40/638
(58) Field of Search .............................. 428/66.6, 136; 369/272, 273, 274, 283, 286, 287, 290, 289; 346/137; 360/135; 83/880; 156/250, 257; 283/81; 40/340, 638

(56) References Cited

U.S. PATENT DOCUMENTS

| | | | |
|---|---|---|---|
| 1,500,698 A | | 7/1924 | Wiehl |
| 1,732,747 A | * | 10/1929 | Germain ..................... 369/282 |
| 2,353,369 A | | 7/1944 | Sears |
| 3,970,803 A | | 7/1976 | Kinzie, Jr. et al. |
| 4,204,686 A | * | 5/1980 | Church ........................ 369/212 |
| 4,903,255 A | | 2/1990 | Sugaya et al. |
| 5,346,654 A | | 9/1994 | Kodaka et al. |
| 5,509,991 A | | 4/1996 | Choi |
| 5,543,001 A | | 8/1996 | Casillo et al. |
| 5,725,931 A | | 3/1998 | Landin et al. |
| 5,770,289 A | * | 6/1998 | Tracy ........................... 283/81 |
| 5,882,555 A | | 3/1999 | Rohde et al. |

FOREIGN PATENT DOCUMENTS

JP 04185317 2/1994

OTHER PUBLICATIONS

IBM Technical Disclosure Bulletin; "Label Applicator"; pp. 2376–2377; Published Dec., 1973.
IBM Technical Disclosure Bulletin; "Diskette Labeler"; pp. 2413–2414; Published Nov., 1986.
IBM Technical Disclosure Bulletin; "Label Printing Software"; 1–page; Published May, 1985.
IBM Technical Disclosure Bulletin; "Diskette Label Printer"; pp. 4146–4148; Published Feb. 1986.
IBM Technical Disclosure Bulletin; "Rotatable Label Plate"; pp. 299–300; Published Apr. 1993.
IBM Technical Disclosure Bulletin; "Pressure Sensitive Adhesive Label Placement Apparatus"; pp. 247–250; Published Sep. 1995.

* cited by examiner

Primary Examiner—William P. Watkins, III
(74) Attorney, Agent, or Firm—Adams, Schwartz & Evans, P.A.

(57) ABSTRACT

A label for an optical disk of the type having a hole therethrough for being positioned onto a rotatable spindle by which the optical disk is rotated. The label is formed of a sheet having a size and shape for being positioned on and adhered to the optical disk and overlying the hole. The sheet includes a plurality of slits formed therein for being positioned in registration with the hole in the disk when the label is positioned on the disk and defining between the slits a plurality of adjacent sheet segments for normally residing in the plane of the sheet and being deformable from the plane of the sheet in response to an object being extended into the hole, whereby the plurality of sheet segments can be provided with visual material while not interfering with the utility of the hole in the disk.

32 Claims, 5 Drawing Sheets

OPTICAL DISK LABEL AND METHOD

TECHNICAL FIELD AND BACKGROUND OF THE INVENTION

This invention relates to a label for an optical disk. Optical disks presently take many forms, and include plastic disks which contain digital data which may represent computer software, music, video, graphics and many other types of digital data. Such disks are presently made in many sizes and are referred to by different names, for example, CD's, compact disks, optical disks, DVD's, and include unrecorded disks which can be "burned" by consumers and disks which are capable of being recorded and then re-recorded. These disks are typically circular.

Optical disks are also now made and sold which have irregular shapes, and are used for many purposes including business advertising. Such disks can be formed in virtually any shape so long as they will fit into and function in a disk player. One such shape commonly made and distributed is a "business card" disk, which comprises a optical disk which has been cut down in size so that two of the opposing sides are parallel, and the other two opposing sides are convex. The principal requirement for such disks is that the data area exist as a continuous annular area symmetrically positioned around the center hole by which the optical disk is placed on the spindle of a disk player. Such disks are approximately the size of a business card, or somewhat larger.

This application relates to all types of optical disks which have a hole formed in them by which they are rotated during playback. The hole is required not only for playback of the optical disk, but during manufacture, during which large stacks of optical disk's are manipulated and transported on long rods or spindles.

The existence and necessity of the hole presents a significant disadvantage in the use of optical disks as advertising and promotional products, since the hole is relatively large in relation to the overall size of the disk, particularly in the smaller format disks and those with irregular shapes. For example, with the so called "business card" optical disk, the location of the hole has heretofore required that text and graphics material be sized and arranged to fit around the hole, limiting the size of the text and graphics and thus the attractiveness and distinctiveness of the text and graphics material.

Text and graphics labels are generally applied to the optical disk by silk screening onto one side of the disk, or by applying a paper or foil label to one side of the disk. The silk screening process avoids the hole in the center of the disk, and paper labels include a hole which is aligned with the hole in the disk. As used in this application, the term "label", except as otherwise defined or clear from context, refers to a means by which text and/or graphics material is applied to the disk, whether by silk screening, application of a sheet label, other otherwise.

The invention disclosed in this application permits text and/or graphics material to be applied to the center portion of an optical disk, including the area occupied by the hole in the center of the disk.

SUMMARY OF THE INVENTION

Therefore, it is an object of the invention to provide a label for an optical disk which permits text and/or graphics to be placed over the hole in the center of the optical disk.

It is another object of the invention to provide a label for an optical disk which permits text and/or graphics to be placed over the hole in the center of the optical disk without interfering with the utility of the hole.

It is another object of the invention to provide a means of permitting text and/or graphics to be placed over the hole in the center of an optical disk having a silk-screened label thereon.

It is another object of the invention to provide a means of permitting text and/or graphics to be placed over the hole in the center of an optical disk having a sheet label thereon.

These and other objects of the present invention are achieved in the preferred embodiments disclosed below by providing a label for an optical disk of the type having a hole therethrough for being positioned onto a rotatable spindle by which the optical disk is rotated. The label comprises a sheet having a size and shape for being positioned on and adhered to the optical disk and overlying the hole. The sheet includes a plurality of slits formed therein for being positioned in registration with the hole in the disk when the label is positioned on the disk and defining between the slits a plurality of adjacent sheet segments for normally residing in the plane of the sheet and being deformable from the plane of the sheet in response to an object being extended into the hole, whereby the plurality of sheet segments can be provided with visual material while not interfering with the utility of the hole in the disk.

According to one preferred embodiment of the invention, the label is formed from material selected from the group consisting of paper, foil and plastic.

According to another preferred embodiment of the invention, the label has a shape which has the same shape as the disk.

According to yet another preferred embodiment of the invention, the plurality of slits comprises a plurality of converging, intersecting slits, an outer extent of which collectively define a polygon.

According to yet another preferred embodiment of the invention, the plurality of slits comprises four slits which cross each other to form eight adjacent sheet segments.

According to yet another preferred embodiment of the invention, the label has two opposing parallel sides and two opposing arcuate sides.

According to yet another preferred embodiment of the invention, the label is sized to overlie the hole and a radially outwardly-extending area outboard of the hole, wherein the full extent of the label is inboard of an optical data area on the disk.

According to yet another preferred embodiment of the invention, the label is adhered to a ring which is fitted into and retained within the hole.

According to yet another preferred embodiment of the invention, the optical disk has a first design element thereon, and the label includes a second design element thereon which, when applied to the disk, forms with the first design element a unitary design wherein the hole is completely covered and invisible.

According to yet another preferred embodiment of the invention, a label is provided for an optical disk of the type having a hole therethrough for being positioned onto a rotatable spindle by which the optical disk is rotated, and comprises an integrally-formed web overlying the hole and including a plurality of slits formed therein defining between a plurality of adjacent web segments. The segments are deformable in response to an object being extended into the hole, whereby the plurality of web segments can be provided with visual material while not interfering with the utility of the hole in the disk.

According to yet another preferred embodiment of the invention, an optical disk of the type having a hole therethrough for being positioned onto a rotatable spindle by which the optical disk is rotated, is provided in combination with of a label formed of a sheet having a size and shape for being positioned on and adhered to the optical disk and overlying the hole, the sheet including a plurality of slits formed therein for being positioned in registration with the hole in the disk when the label is positioned on the disk and defining between the slits a plurality of adjacent sheet segments for normally residing in the plane of the sheet and being deformable from the plane of the sheet in response to an object being extended into the hole. The plurality of sheet segments can be provided with visual material while not interfering with the utility of the hole in the disk.

An embodiment of the method of producing an optical disk for being positioned onto a rotatable spindle by which the optical disk is rotated according to the invention comprises the steps of forming a disk having a hole therein by which the disk is placed on and rotated by the rotatable spindle and forming a label to be applied to the disk, the label comprising a sheet having a size and shape for being positioned on and adhered to the optical disk and overlying the hole. A plurality of slits is formed in the label for being positioned in registration with the hole in the disk when the label is positioned on the disk. The slits define between a plurality of adjacent sheet segments for normally residing in the plane of the sheet and are deformable from the plane of the sheet in response to an object being extended into the hole, whereby the plurality of sheet segments can be provided with visual material while not interfering with the utility of the hole in the disk. The label is applied to the disk with the slits in registration with the hole.

According to one preferred embodiment of the invention, the method includes the step of forming the label from material selected from the group consisting of paper, foil and plastic.

According to another preferred embodiment of the invention, the method includes the step of forming the label in a shape which has the same shape as the disk.

According to yet another preferred embodiment of the invention, the step of forming a plurality of slits comprises the step of forming a plurality of converging, intersecting slits, an outer extent of which collectively define a polygon.

According to yet another preferred embodiment of the invention, the step of forming the plurality of slits comprises the step of forming four slits which cross each other to form eight adjacent sheet segments.

According to yet another preferred embodiment of the invention, the step of forming the label comprises the step of forming the label with two opposing parallel sides and two opposing arcuate sides.

According to yet another preferred embodiment of the invention, the step of forming the label includes the step of forming the label with a size to overlie the hole and a radially outwardly-extending area outboard of the hole, further wherein the full extent of the label is inboard of an optical data area on the disk.

According to yet another preferred embodiment of the invention, the method includes the step of adhering the label to a ring which is fitted into and retained within the hole.

According to yet another preferred embodiment of the invention, a method of producing an optical disk includes the steps of applying a first design element to the disk and applying a second design element to the label which, when applied to the disk, forms with the first design element a unitary design wherein the hole is completely covered and invisible.

According to yet another preferred embodiment of the invention, a method is provided for producing an optical disk for being positioned onto a rotatable spindle by which the optical disk is rotated, and comprises the steps of forming a disk having a hole therein by which the disk is placed on and rotated by the rotatable spindle, forming an integrally-formed web overlying the hole, and forming a plurality of slits in the web for being positioned in registration with the hole in the disk and defining between the slits a plurality of adjacent web segments for being deformable in response to an object being extended into the hole, whereby the plurality of web segments can be provided with visual material while not interfering with the utility of the hole in the disk.

According to yet another preferred embodiment of the invention, a method is provided of forming a label for a disk of the type having a hole therein for being received on a spindle, and includes the steps of forming a sheet for being adhered to the disk, forming a plurality of slits in the sheet, the slits being positioned in the sheet to overlie the hole in the disk when the sheet is adhered to the disk. The slits define between them a plurality of sheet segments which normally lie in the plane of the sheet and are deformable out of the plane of the sheet when the disk is placed on the spindle.

According to yet another preferred embodiment of the invention, the step of forming the plurality of slits comprises the step of forming a plurality of converging slits which collectively define a star-shaped array.

According to yet another preferred embodiment of the invention, the method includes the step of applying a text or graphic element to the plurality of sheet segments.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
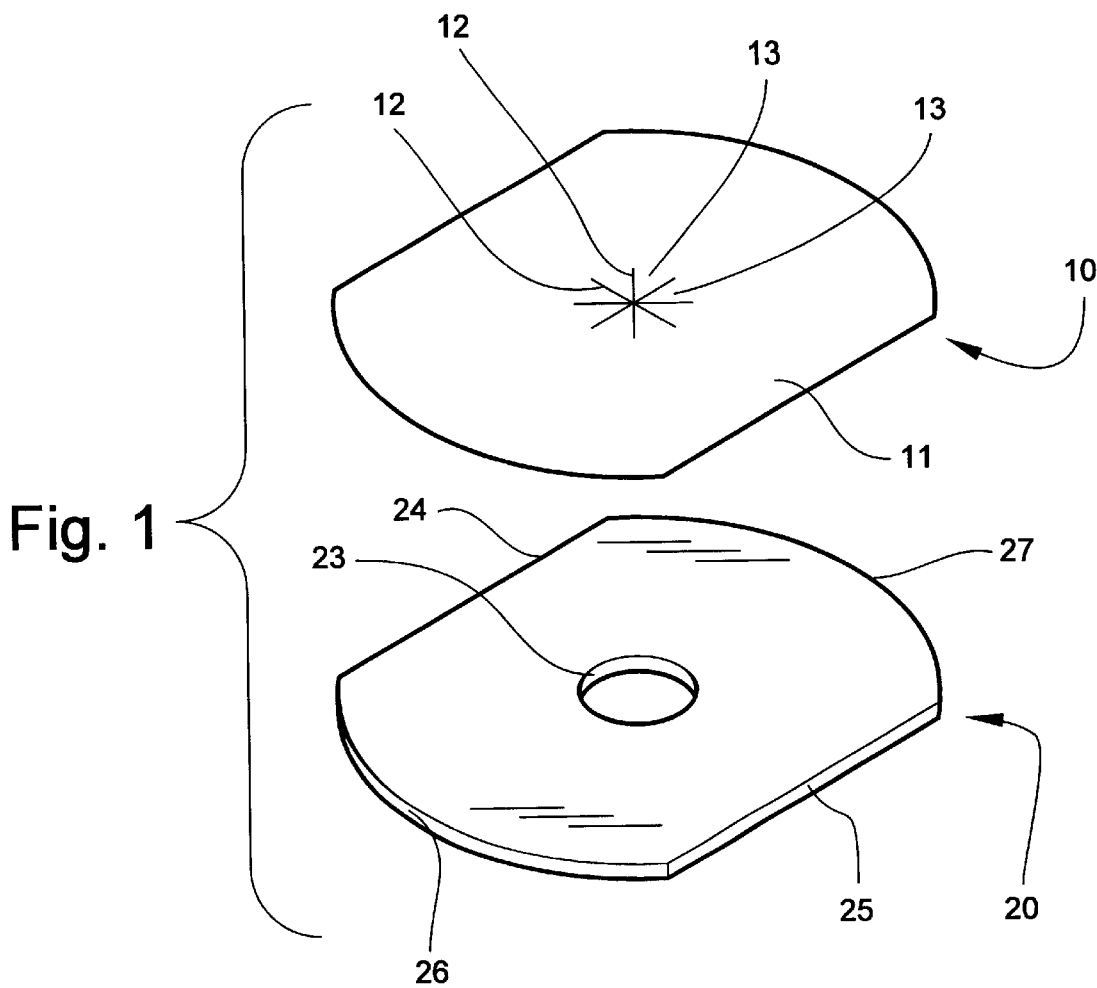
FIG. 1 is an exploded view of a label and optical disk according to one embodiment of the invention.
Figure 2:
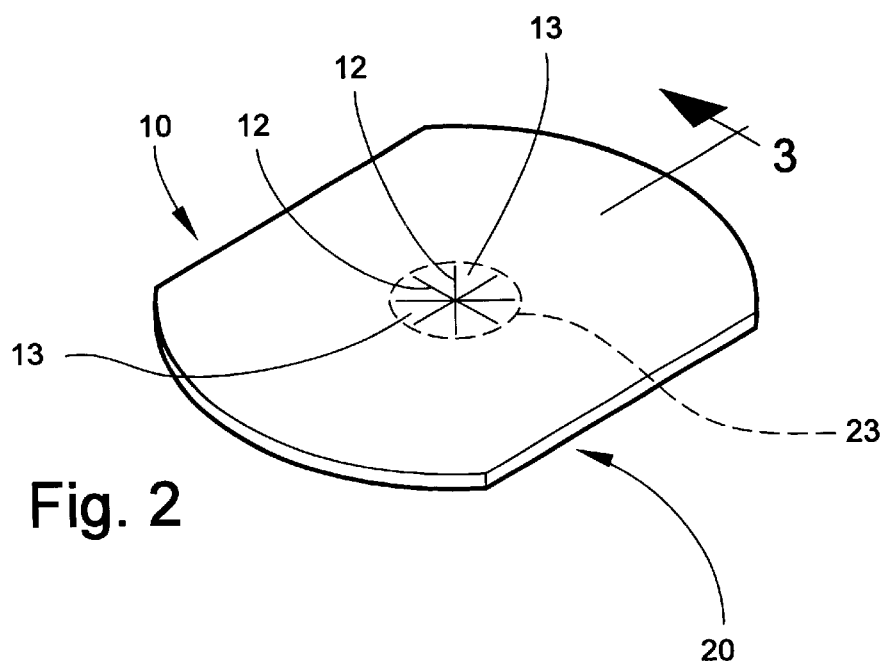
FIG. 2 is a view of the label and optical disk of FIG. 1, as assembled.

Referring now specifically to the drawings, a label according to the present invention is illustrated in FIG. 1 and shown generally at reference numeral 10. Label 10 is any suitable sheet material 11, such as paper or card stock, metal or plastic foil, or other plastic sheet material. Label 10 can be shaped to fit onto any optical disk of any size or shape. A plurality of slits 12 are formed in the sheet 11 and converge and intersect to form a star-shaped area defined by adjacent sheet segments 13. The slits 12 are placed in the label 10 in registration with the hole 23 so that when the label 10 is applied to the optical disk 20, the sheet segments 13 overlie the hole 23. The slits may be cut by any suitable method. As is shown in FIG. 2, the label 10 completely covers the hole 23 and renders it invisible. The slits 12 are only faintly visible, and lie in the plane of the sheet 11. This permits text and or graphics material to be placed on the label 10 without regard to the existence of the hole 23 in the optical disk 20. See FIGS. 6, 7 and 8.

Figure 3:
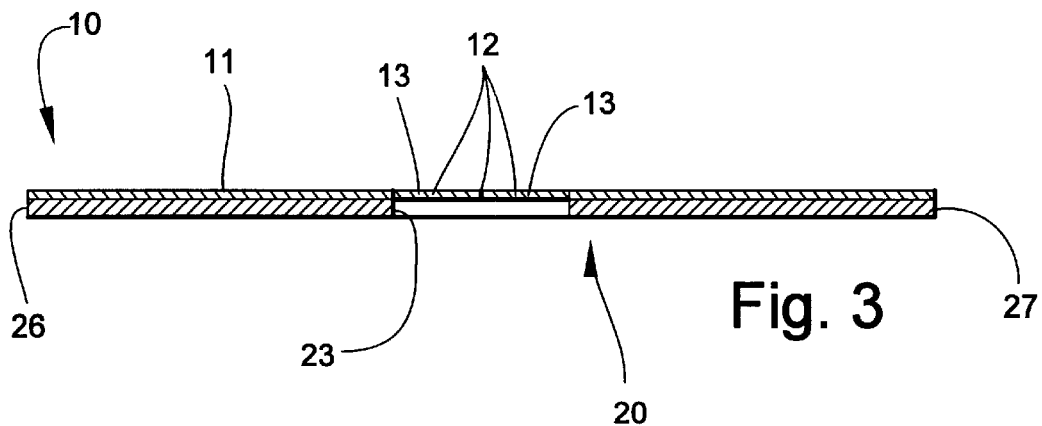
FIG. 3 is a vertical cross-section taken substantially along section line 3 of FIG. 2.
Figure 4:
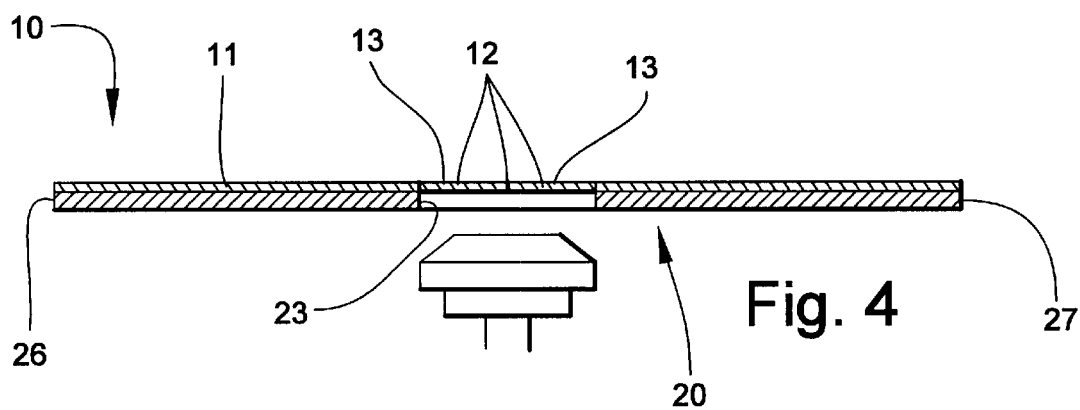
FIG. 4 is a cross-section as in FIG. 3, showing the orientation of a spindle to the hole and overlying label.
Figure 5:
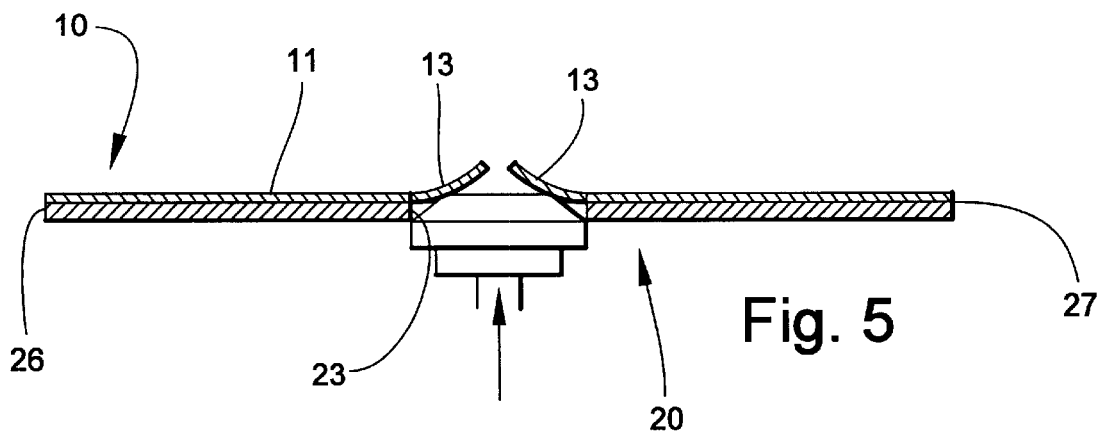
FIG. 5 is a cross-section as in FIG. 3, showing the spindle in the hole.

As is shown in FIGS. 3, 4 and 5, the sheet segments 13 are deformed upwardly as a spindle is extended through the hole 23. When the spindle is removed, the sheet segments 13 return to the plane of the sheet 11. If necessary, the sheet segments 13 can be pressed downwardly to resume a position in the plane of the sheet 11.

Figure 6:
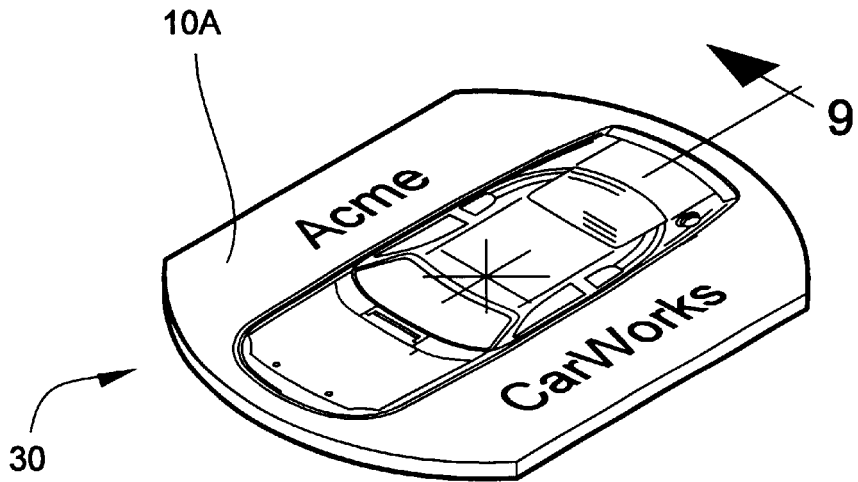
FIG. 6 is a perspective view of an optical disk having an integrally-formed web overlying the hole.
Figure 7:
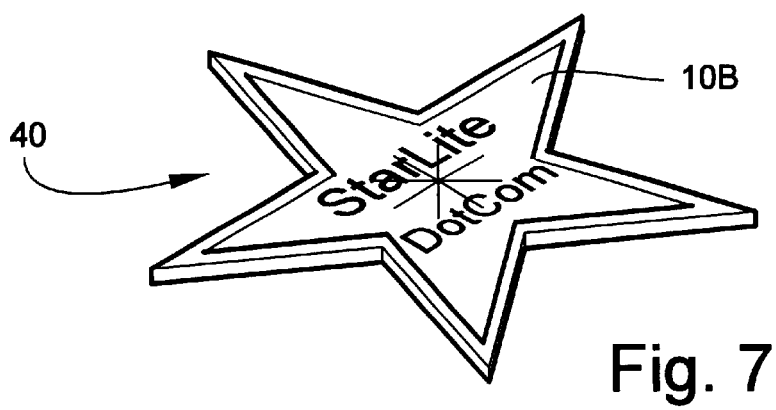
FIGS. 7 and 8 are perspective views of optical disks having sheet labels applied thereto.
Figure 8:
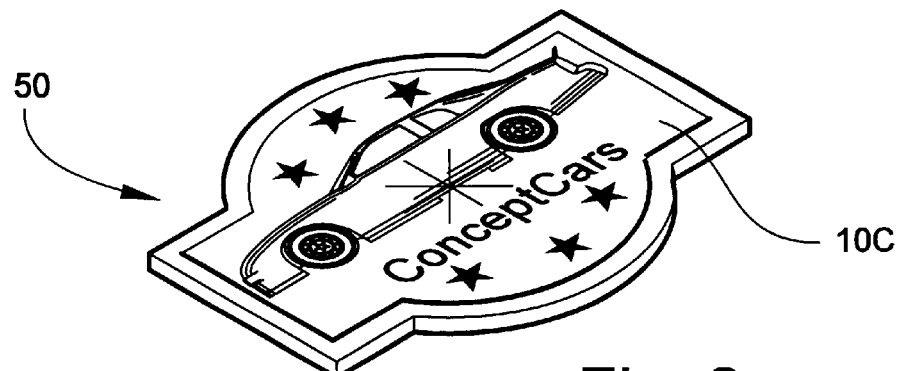

As is shown in FIGS. 6, 7 and 8, optical disks 30, 40 and 50 illustrate that text and/or graphics material can be placed on the labels 10A, 10B, 10C to occupy the area over the hole.

Figure 9:
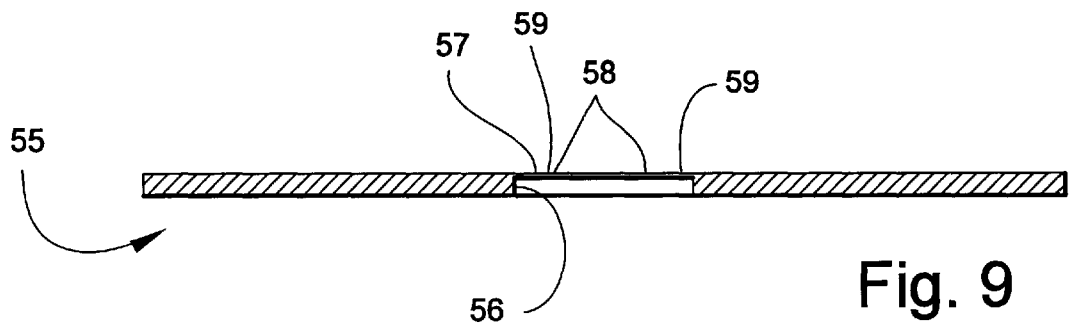
FIG. 9 is a cross-section of a optical disk wherein the hole is covered by an integrally-molded web.

Referring now to FIG. 9, an optical disk 55 is shown in cross-section, and includes a hole 56 covered by an integrally-molded, very thin web 57 which serves as a substrate which can be silk-screened or otherwise provided with text or graphics material, or merely painted with a desired color. The web 57 is provided with slits 58 arranged in a pattern such as shown above. The slits 58 permit the adjacent segments 59 to be deflected upwardly by an object such as a spindle inserted through the hole 56, as described above. The thickness and thus the flexibility is determined empirically based upon the plastic material from which the optical disk is molded.

Figure 10:
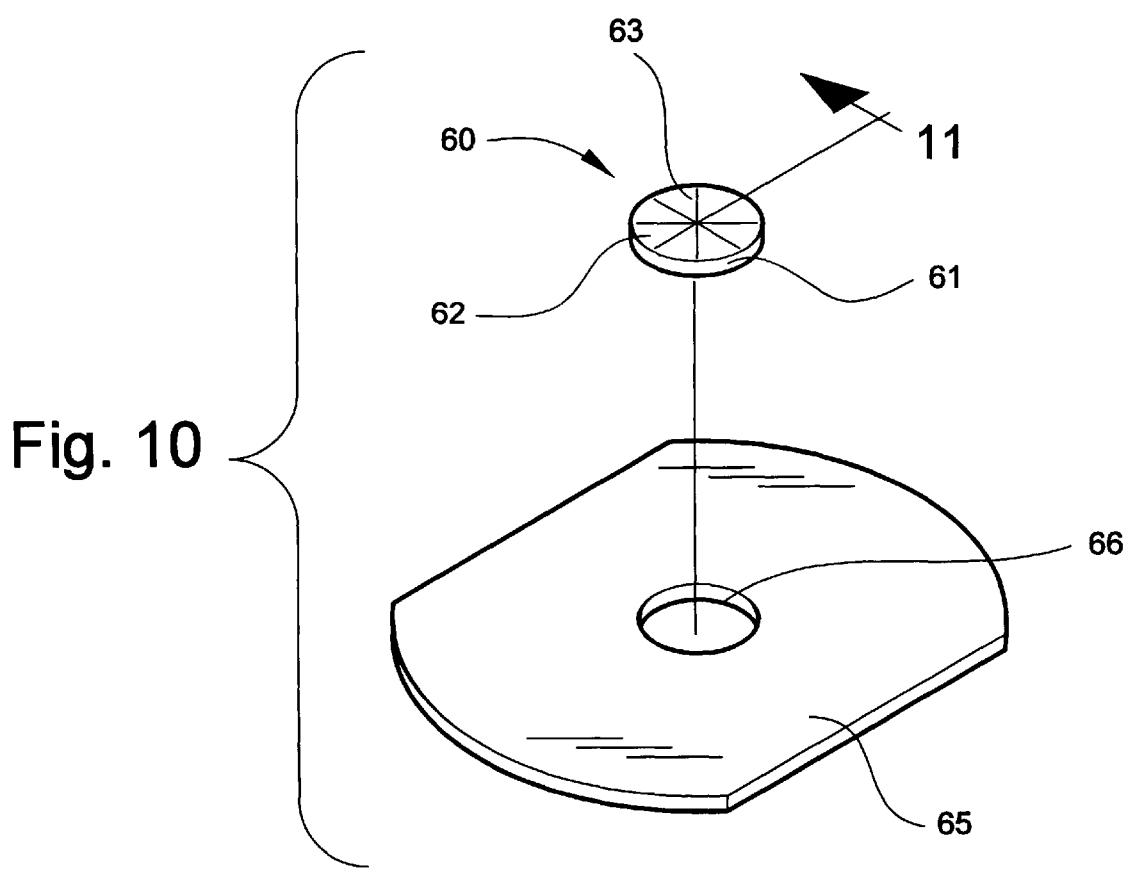
FIG. 10 is an exploded perspective view showing an insert for being inserted into a hole in the center of a optical disk.
Figure 11:
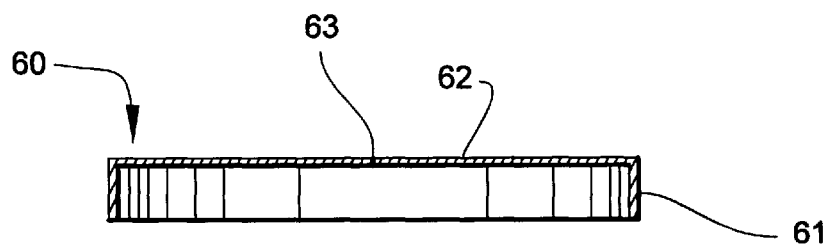
FIG. 11 is a cross-section taken along section line 11 of FIG. 10.

Referring now to FIGS. 10 and 11, an insert 60 is provided for being placed on an optical disk 65 in the hole 66. Insert 60 is formed of a thin annular ring 61 onto which is applied a sheet 62 having slits 63 which function as described above. It may be necessary to enlarge the hole 66 to the extent necessary to accommodate the thickness of the ring 61. Preferably, the insert 60 is applied to the optical disk 65 by means of a press fit. The insert is particularly desireable when the label of the optical disk 65 is to be applied by means of silk-screening rather than by a sheet label, such as a label 10, 10A, 10B or 10C.

Figure 12:
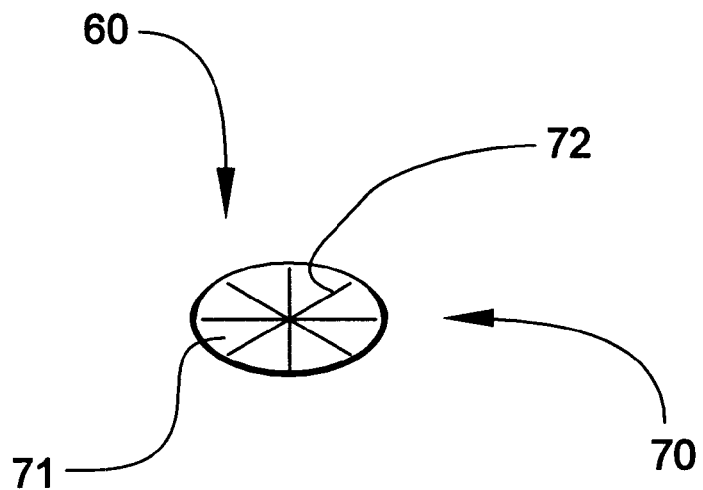
FIG. 12 is a perspective view of a label intended for placement over the hole in an optical disk disk.
Figure 13:
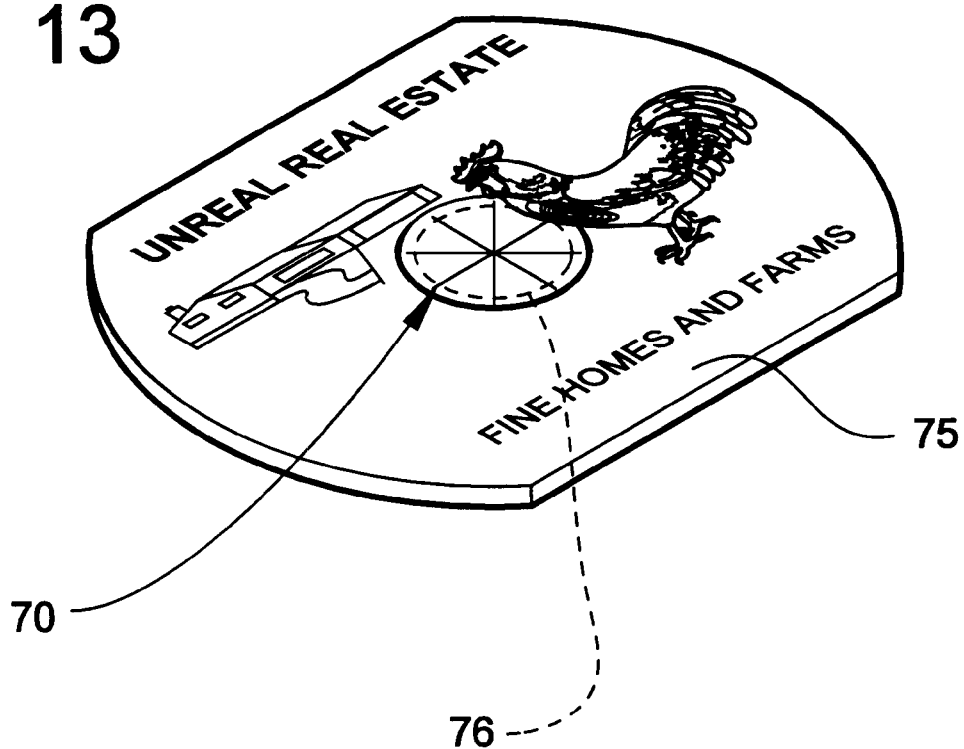
FIG. 13 is a perspective view of the label in FIG. 12 in place on an optical disk.

Referring now to FIGS. 12 and 13, a small label 70 is shown which is sized to fit over the hole in the optical disk and a small surrounding area. The label 70 is formed of a sheet material 71 which is provided with slits 72, as described above. The label 70 is applied over any optical disk 75 with a hole 76 in the center, which may then be, for example, silk-screened. The silk-screened design would therefore print onto the label 70 along with the rest of the surface of the disk 75. Alternatively, the label 70 may be applied a previously silk-screened optical disk, in which case the label 70 must be oriented to match the previously applied text or graphics if required by the pattern.

A label for an optical disk and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A label for an optical disk of the type having a hole therethrough for being positioned onto a rotatable spindle by which the optical disk is rotated, and comprising a sheet having a size and shape for being positioned on and adhered to the optical disk and overlying and covering the hole, said sheet including a plurality of slits formed therein for being positioned in registration with the hole in the disk when the label is positioned on the disk and defining between the slits a plurality of adjacent sheet segments for normally residing in the plane of the sheet and providing an appearance of an imperforate sheet, said slits being deformable upwardly from the plane of the sheet in response to the optical disk being placed onto the rotatable spindle for use, whereby the plurality of sheet segments covering the hole can be provided with visual material while not interfering with the utility of the hole in the disk.

2. A label according to claim 1, wherein said label is formed from material selected from the group consisting of paper, foil and plastic.

3. A label according to claim 1, wherein said label has a shape which has the same shape as the disk.

4. A label according to claim 1, wherein said plurality of slits comprises a plurality of converging, intersecting slits, an outer extent of which collectively define a polygon.

5. A label according to claim 4, wherein said plurality of slits comprises four slits which cross each other to form eight adjacent sheet segments.

6. A label according to claim 1, wherein said label has two opposing parallel sides and two opposing arcuate sides.

7. A label according to claim 1, wherein the label is sized to overlie the hole and a radially outwardly-extending area outboard of the hole, wherein the full extent of the label is inboard of an optical data area on the disk.

8. A label according to claim 1, wherein the label is adhered to a ring which is fitted into and retained within the hole.

9. A label according to claim 1, wherein the optical disk has a first design element thereon, and further wherein the label includes a second design element thereon which, when applied to the disk, forms with the first design element a unitary design wherein the hole is completely covered and invisible.

10. A label for an optical disk of the type having a hole therethrough for being positioned onto a rotatable spindle by which the optical disk is rotated, said label comprising an integrally-formed web overlying the hole and including a plurality of slits formed therein for residing over and covering the hole when the label is placed on the optical disk to give the appearance of an imperforate sheet, and defining between the slits a plurality of adjacent web segments and deformable in response to an object being extended into the hole, whereby the plurality of web segments covering the hole can be provided with visual material while not interfering with the utility of the hole in the disk.

11. In an optical disk of the type having a hole therethrough for being positioned onto a rotatable spindle by which the optical disk is rotated, the combination therewith of a label formed of a sheet having a size and shape for being positioned on and adhered to the optical disk and overlying the hole, said sheet including a plurality of slits formed therein for being positioned in registration with the hole in the disk when the label is positioned on the disk and defining between the slits a plurality of adjacent sheet segments for normally residing in the plane of the sheet over the hole and giving the appearance of an imperforate sheet, and being deformable from the plane of the sheet in response to the rotatable spindle being extended into the hole, whereby the plurality of sheet segments covering the hole can be provided with visual material while not interfering with the utility of the hole in the disk.

12. In an optical disk according to claim 11, wherein said label is formed from material selected from the group consisting of paper, foil and plastic.

13. In an optical disk according to claim 11, wherein said label has a shape which has the same shape as the disk.

14. In an optical disk according to claim 11, wherein said plurality of slits comprises a plurality of converging, intersecting slits, an outer extent of which collectively define a polygon.

15. In an optical disk according to claim 14, wherein said plurality of slits comprises four slits which cross each other to form eight adjacent sheet segments.

16. In an optical disk according to claim 11, wherein said label has two opposing parallel sides and two opposing arcuate sides.

17. In an optical disk according to claim 11, wherein the label is sized to overlie the hole and a radially outwardly-extending area outboard of the hole, wherein the full extent of the label is inboard of an optical data area on the disk.

18. In an optical disk according to claim 11, wherein the label is adhered to a ring which is fitted into and retained within the hole.

19. In an optical disk according to claim 11, wherein the optical disk has a first design element thereon, and further wherein the label includes a second design element thereon which, when applied to the disk, forms with the first design element a unitary design wherein the hole is completely covered and invisible.

20. A method of producing an optical disk for being positioned onto a rotatable spindle by which the optical disk is rotated, and comprising the steps of:
   (a) forming a disk having a hole therein by which the disk is placed on and rotated by the rotatable spindle;
   (b) forming a label to be applied to the disk, said label comprising a sheet having a size and shape for being positioned on and adhered to the optical disk and overlying and covering the hole;
   (c) forming a plurality of slits in the label for being positioned in registration with the hole in the disk when the-label is positioned on the disk and defining between the slits a plurality of adjacent sheet segments for normally residing in the plane of the sheet, covering the hole and giving the appearance of an imperforate sheet, and being deformable from the plane of the sheet in response to the rotatable spindle being extended into the hole, whereby the plurality of sheet segments can be provided with visual material while not interfering with the utility of the hole in the disk; and
   (d) applying the label to the disk with the slits in registration with the hole.

21. A method of producing an optical disk according to claim 20, and including the step of forming the label from material selected from the group consisting of paper, foil and plastic.

22. A method of producing an optical disk according to claim 20, and including the step of forming the label in a shape which has the same shape as the disk.

23. A method of producing an optical disk according to claim 20, wherein the step of forming a plurality of slits comprises the step of forming a plurality of converging, intersecting slits, an outer extent of which collectively define a polygon.

24. A method of producing an optical disk according to claim 23, wherein the step of forming said plurality of slits comprises the step of forming four slits which cross each other to form eight adjacent sheet segments.

25. A method of producing an optical disk according to claim 20, wherein said the step of forming the label comprises the step of forming the label with two opposing parallel sides and two opposing arcuate sides.

26. A method of producing an optical disk according to claim 20, wherein the step of forming the label includes the step of forming the label with a size to overlie the hole and a radially outwardly-extending area outboard of the hole, further wherein the full extent of the label is inboard of an optical data area on the disk.

27. A method of producing an optical disk according to claim 20, and including the step of adhering the label to a ring which is fitted into and retained within the hole.

28. A method of producing an optical disk according to claim 20, and including the steps of:
   (a) applying a first design element to the disk; and (b) applying a second design element to the label which, when applied to the disk, forms with the first design element a unitary design wherein the hole is completely covered and invisible.

29. A method of producing an optical disk for being positioned onto a rotatable spindle by which the optical disk is rotated, and comprising the steps of:
   (a) forming a disk having a hole therein by which the disk is placed on and rotated by the rotatable spindle;
   (b) forming an integrally-formed web overlying the hole; and
   (c) forming a plurality of slits in the web for being positioned in registration with the hole in the disk and defining between the slits a plurality of adjacent web segments, said web segments covering the hole and giving the appearance of an imperforate web overlying the hole, said adjacent web segments for being deformable in response to an object being extended into the hole, whereby the plurality of web segments can be provided with visual material while not interfering with the utility of the hole in the disk.

30. A method of forming a label for a disk of the type having a hole therein for being received on a spindle, and including the steps of:
   (a) forming a sheet for being adhered to the disk; and
   (b) forming a plurality of slits in the sheet, the slits being positioned in the sheet to overlie the hole in the disk when the sheet is adhered to the disk, said slits defining between them a plurality of sheet segments which normally lie in the plane of the sheet and give the appearance of the sheet being imperforate, wherein the sheet segments are deformable out of the plane of the sheet when the disk is placed on the spindle.

31. A method according to claim 30, wherein the step of forming the plurality of slits comprises the step of forming a plurality of converging slits which collectively define a star-shaped array.

32. A method according to claim 30, and including the step of applying a text or graphic element to the plurality of sheet segments.

* * * * *